United States Patent
Chauveau

(10) Patent No.: US 10,606,076 B2
(45) Date of Patent: Mar. 31, 2020

(54) DUAL-IMAGE HEAD-UP DISPLAY

(71) Applicant: VISTEON GLOBAL TECHNOLOGIES, INC., Van Buren Township, MI (US)

(72) Inventor: Benoit Chauveau, Van Buren Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 121 days.

(21) Appl. No.: 15/666,070

(22) Filed: Aug. 1, 2017

(65) Prior Publication Data

US 2019/0041635 A1 Feb. 7, 2019

(51) Int. Cl.
*G02B 27/01* (2006.01)

(52) U.S. Cl.
CPC ..... *G02B 27/0101* (2013.01); *G02B 27/0149* (2013.01); *G02B 2027/014* (2013.01); *G02B 2027/0141* (2013.01); *G02B 2027/0183* (2013.01)

(58) Field of Classification Search
CPC ... B02B 27/01; B02B 27/0101; B02B 27/017; B02B 27/0103; B02B 27/0176; B02B 27/0149; B02B 27/0172; B02B 27/0179; B02B 2027/014; B02B 2027/0145; B02B 2027/0141; B02B 2027/0118; B02B 2027/0183; B02B 2027/0147

USPC ........ 359/13, 630–633; 348/115, 116; 345/7, 345/8, 419, 633
See application file for complete search history.

(56) References Cited

U.S. PATENT DOCUMENTS

| | | | | |
|---|---|---|---|---|
| 6,243,068 | B1 * | 6/2001 | Evanicky | G02B 6/0068 345/102 |
| 6,791,636 | B2 * | 9/2004 | Paolini | G02B 6/0038 349/112 |
| 2007/0063941 | A1 * | 3/2007 | Tanaka | B60K 35/00 345/87 |
| 2010/0066646 | A1 * | 3/2010 | Ota | G02F 1/133512 345/9 |
| 2011/0175798 | A1 * | 7/2011 | Sato | B60K 35/00 345/7 |
| 2014/0043377 | A1 * | 2/2014 | Tanaka | G02B 6/0053 345/690 |

* cited by examiner

*Primary Examiner* — Jie Lei
(74) *Attorney, Agent, or Firm* — Quinn IP Law

(57) ABSTRACT

Disclosed herein are devices, methods and systems for implementing a dual image head-up display incorporating a single picture generating unit (PGU). The aspects disclosed herein obviate a blind wall construction and achieve the results created by systems employing two distinct PGUs. The aspects disclosed herein are also directed to an optimized backlighting system and construction for employment with the disclosed HUD systems.

16 Claims, 7 Drawing Sheets

DUAL-IMAGE HEAD-UP DISPLAY

BACKGROUND

Electronic displays are provided in many contexts to electronically render digital information to a viewer. The electronic displays receive information, and render the information through lighted cells in patterns that reflect the texts and pictures employed to convey the information.

A head-up display (HUD) allows a viewer to view not only the lighted information, but due to the transparent nature of the HUD, the view through the HUD. Thus, a viewer may be delivered information while not losing the ability to view the real world through the HUD.

HUDs are implemented in a variety of contexts, and more commonly in the vehicle. The HUD may be implemented in a variety of surfaces and windows, for example, the front windshield. Thus, when a driver/occupant is in a vehicle, content may be displayed to the driver/occupant on the front windshield accordingly.

FIG. 1 illustrates a perspective view of a sample head-up display (HUD) employing dual-image technology. Referring to FIG. 1, a HUD is implemented in a front windshield of a vehicle. The HUD allows a viewer to see the environment in front of the vehicle, with digital content being display via augmented content. For example, as shown, virtual image 101 shows an augmentation of a lane line, while virtual image 102 shows a speed of travel.

The HUD shown in FIG. 1 has been implemented employing various techniques. One such implementation has been to use two independent systems. However doing so has led to implementations that employ large amount of space. In the automotive context, where space is limited, these implementations require other componentry and design compromises.

In order to implement a dual-image HUD with a single picture generating unit (PGU), a blind wall design has been relied upon. FIG. 2 illustrates an example HUD system 200 employing a blind wall 255. The HUD system 200 shown has two distinct backlights (251 and 252). Disposed in between the backlights is the blind wall 255.

Each of the backlights is provided a unique path to reflect content, and ultimately project said content onto a HUD screen 210. As shown in FIG. 2, backlight 252 is provided with mirror 280. Conversely, backlight 251 is oriented to first reflect light off a mirror 260, then to mirror 270, and ultimately to mirror 280. After which, content sourced from backlight 251 is projected onto screen 210.

As shown in FIG. 2, light sourced from each backlight is ultimately segregated from leaking out to other paths, and as such, does not interfere with the generated image associated with the other backlight.

However, employing the blind wall 255 as shown in HUD system 200 in FIG. 2 presents additional issues. Because the blind wall has a certain thickness, this inherently creates some losses on the display surface. Further, the blind wall may effectively cancel out most interference, but some interference will still be seen via an unintended optical path.

SUMMARY

The following description relates to providing a system, method, and device for a dual image head-up display (HUD) employing a single source. Exemplary embodiments may also be directed to an optimization of said dual-image HUD with the implementation of an optimized backlight.

A dual image head-up display (HUD) system is disclosed herein. The dual image HUD includes a cell-based display, the cell-based display is defined with a plurality of a first set of columns and a plurality of a second set of column, each of the plurality of first set of columns and each of the plurality of second set of columns alternate with each other; a backlight projecting light to the cell-based display; a plurality of black stripes disposed on the cell-based display on a surface opposite a surface facing the backlight. Each of the plurality of black stripes overlaps at a portion of one of the first set of columns and one of the second set of columns. Another example of a dual image head-up display (HUD) system is disclosed herein. The dual image HUD includes a cell-based display, the cell-based display is defined with a plurality of a first set of columns and a plurality of a second set of column, each of the plurality of first set of columns and each of the plurality of second set of columns alternate with each other; a backlight projecting light to the cell-based display; a plurality of black stripes disposed on the cell-based display on a surface opposite a surface facing the backlight. A chess-like pattern of light blocking material disposed on the cell-based display on a surface opposite a surface facing the backlight.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1:
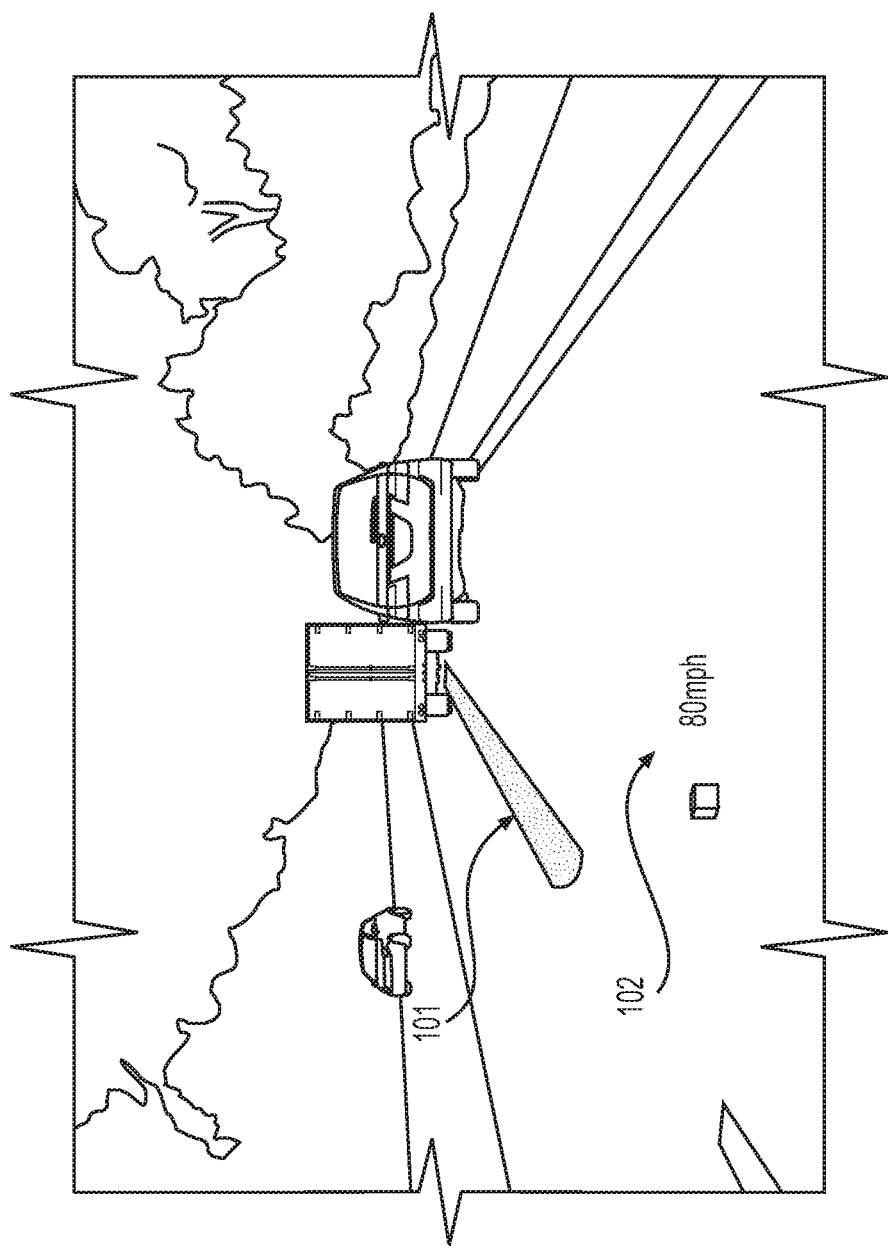
FIG. 1 illustrates a sample head-up display (HUD) employing dual image technology.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Employing a dual image head-up display (HUD) allows many benefits in many different contexts. For example, referring to the view shown in FIG. 1, one virtual image may be used for static content while another may be employed to augment existing real-world objects (such as other vehicles and road conditions). Additionally, by employing multiple images, one virtual image may be associated with an object of one distance while another may be employed with an object of another distance.

Minimizing a HUD implementation is advantageous in many contexts, as certain implementations may be space limited. For example, in the context of a vehicle-based HUD implementation, the front portion of the vehicle, and specifically the cockpit may be reserved for other vehicular elements (such as an instrument cluster, infotainment system, and other electrical, mechanical, and electrometrical componentry).

Some single backlight HUDs have been proposed, such as the blind wall system discussed in the Background section. However, this implementation is fraught with problems including an effected overall display image and leakage from one source to another.

Disclosed herein are methods, systems, and devices associated with and for implementing a dual image HUD. The aspects disclosed herein employ a perspective-based display (or a dual perspective display system) technology incorporated in a HUD.

Figure 3:
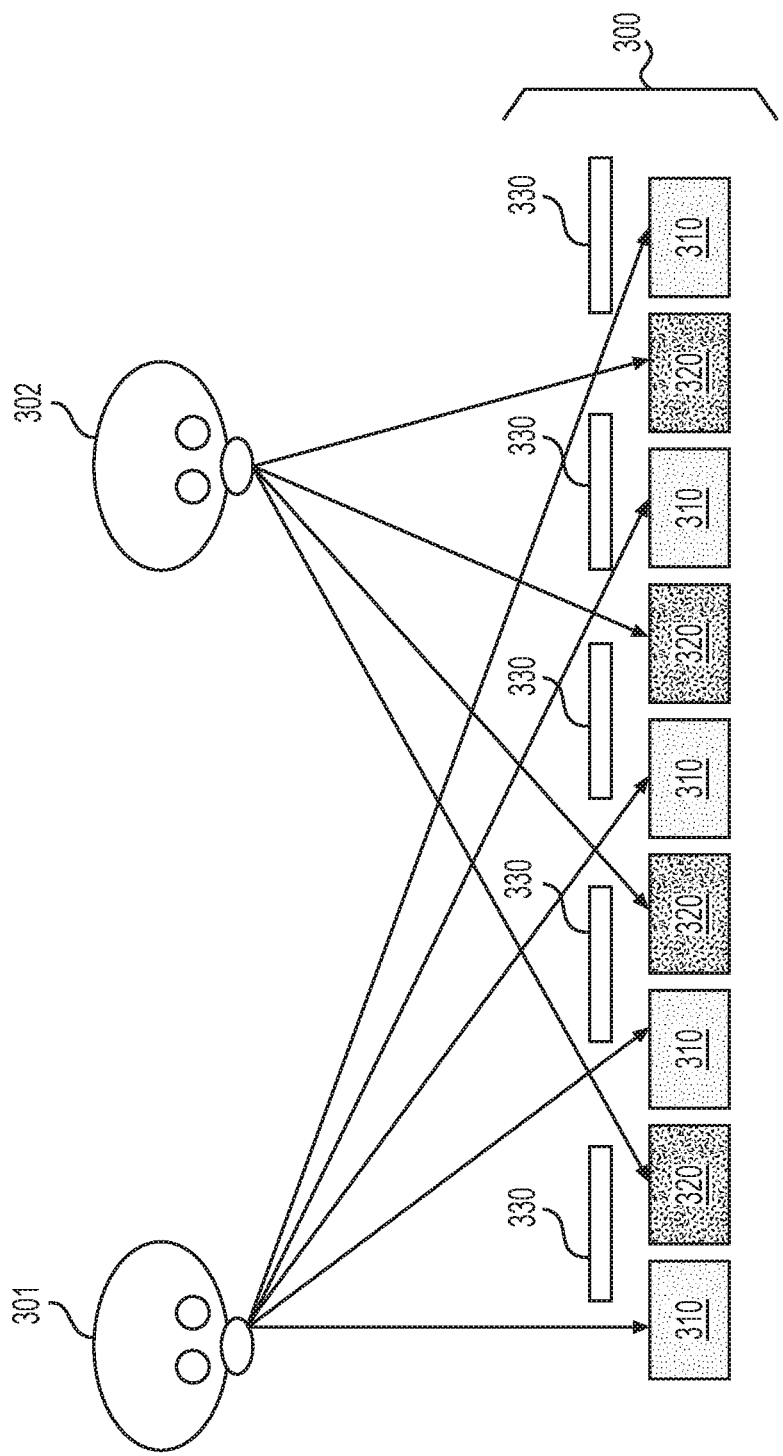
FIG. 3 illustrates an example of a dual perspective display system according to an exemplary embodiment.

FIG. 3 illustrates a top-view of a dual perspective display system according to an exemplary embodiment. Referring to FIG. 3, two viewers (viewer 301 and 302) are shown relatively situated at opposite ends of a display 300 and see different display contents.

Display 300 may be any sort of cell-based display technology, with cells 310 corresponding to a first content and cells 320 corresponding to a second content. Each of cells 310/320 corresponds to a column of a matrix of cells. Each content may be individually associated with an image to be presented via a display system.

Also shown are black stripes 330 that extends from top to bottom over the matrix of cells. The purpose of the black stripes 330 is that it selectively allows a viewer based on location/orientation to see only one set of cells, either cell 310 or 320. It is to be noted that the results are similar with a chess configuration instead of black stripes.

Referring to FIG. 3, viewer 301 is only able to see content associated with cells 310. Conversely, viewer 302 is only able to see content associated with cells 320. Thus, depending on the location of the viewer, content can be selectively delivered. For example, cells 310 can be configured to show one image, while cells 320 can be configured to show another image (wholly different than the first image).

Figure 4:
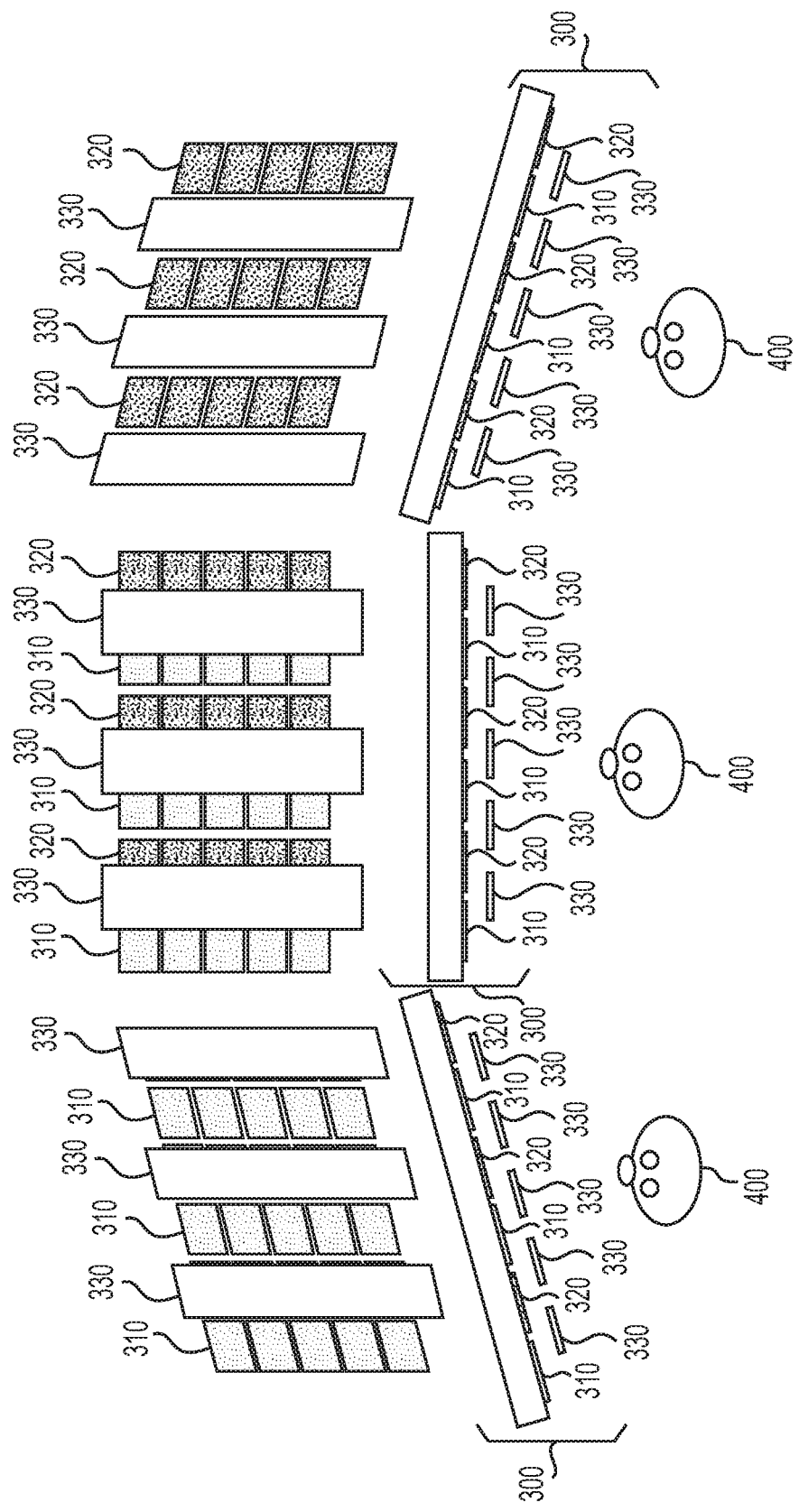
FIGS. 4(a)-(c) illustrate the example of FIG. 3 in further detail.

FIGS. 4(a)-(c) illustrate the example of FIG. 3 in further detail. Specifically, each of FIGS. 4(a)-(c) illustrate a front-view and a top-view of a specific perspective viewing display 300.

Referring to FIG. 4(a), the viewer 400 is viewing the display 300 from the left. Accordingly, the display 300 cells 310 are viewable to the viewer 400, while cells 320 are obscured by a black stripe 330.

Referring to FIG. 4(b), the viewer 400 is viewing the display 300 from the middle. Accordingly, the display 300 cells 310 and 320 are viewable to the viewer 400.

Referring to FIG. 4(c), the viewer 400 is viewing the display 300 from the right. Accordingly, the display 300 cells 320 are viewable to the viewer 400, while cells 310 are obscured by the black stripes 330.

Figure 5:
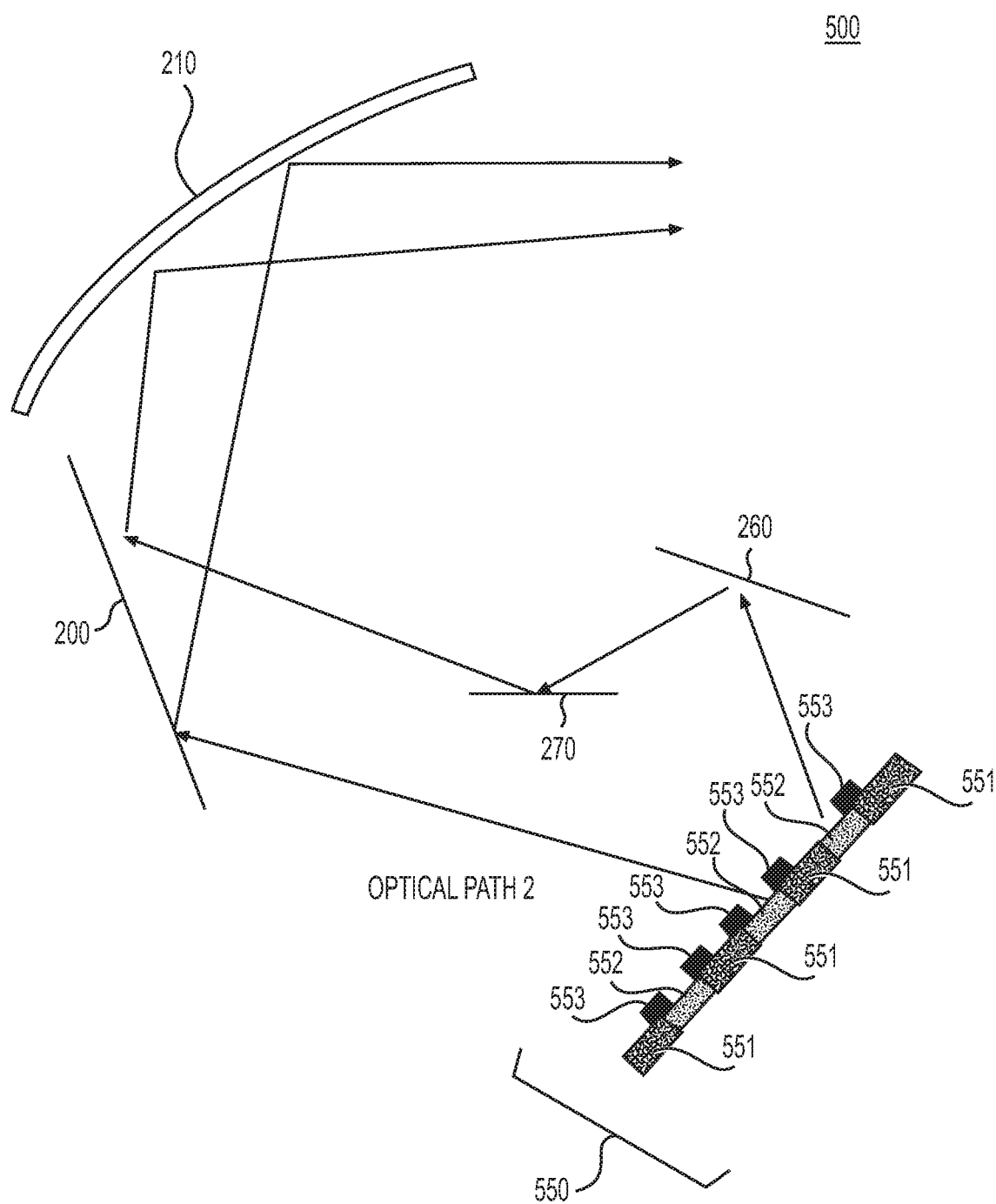
FIG. 5 illustrates a system-level diagram of a HUD system according to an exemplary embodiment.

FIG. 5 illustrates a system-level diagram of a HUD system 500 according to an exemplary embodiment. As shown, a picture generating unit (PGU) 550 employs an alternating arrangement of rows of cells. A PGU may refer to a structure including a backlight, lenses associated with the backlight, and a cell-based display (for example, a TFT implementation).

Referring to the PGU 550, an alternating rows 551 is associated with first content items, while alternating rows 552 is associated with a second content item.

Figure 2:
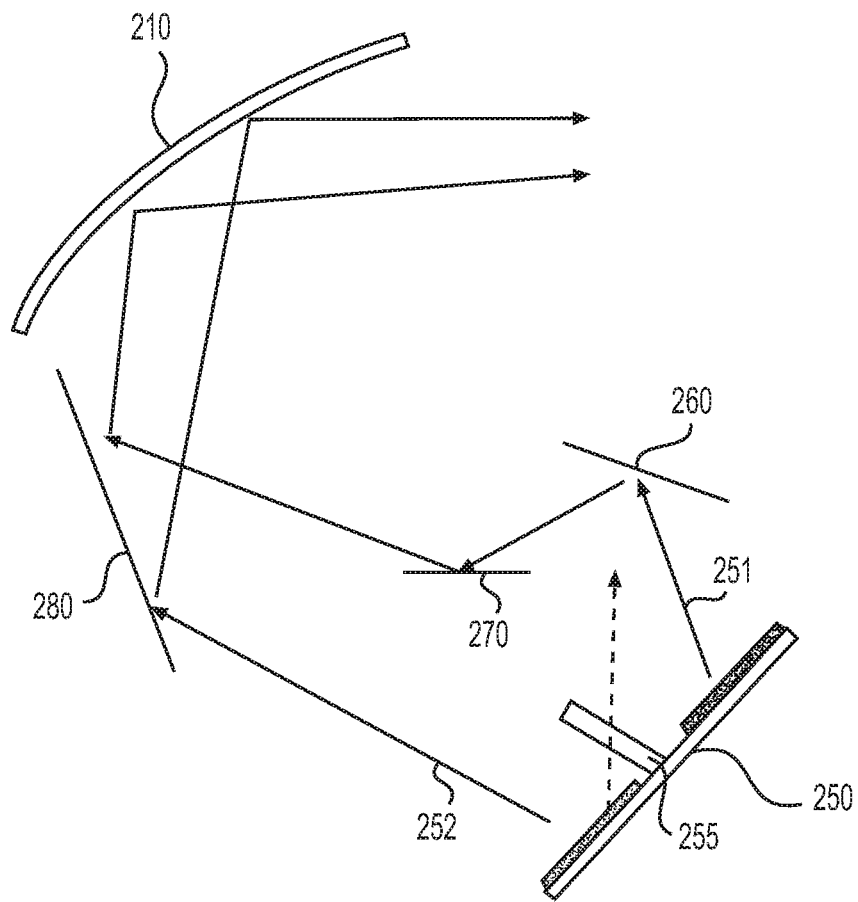
FIG. 2 illustrates a system-level diagram of an example dual-image HUD employing a blind wall.

The mirrors shown in FIG. 5 duplicate the mirror orientation shown in FIG. 2. The first optical path, defined by content being generated by the PGU 550 is propagated to mirror 260, reflected to mirror 270, reflected to mirror 280, and finally reflected to a transparent screen 210. The second optical path is defined by content being generated by the PGU 550 and propagated to mirror 280, and reflected to a transparent screen 210. The transparent screen 210 may be a front windscreen of a vehicle, or alternatively, any transparent surface being employed for a HUD.

As illustrated in FIG. 5, only content generated from rows 551 is seen by mirror 260, while only content generated from rows 552 is seen by mirror 280. As shown in FIG. 5, black stripes 553 are disposed in a manner similar to those shown in FIGS. 3 and 4(a)-(c), and thus selectively allow content generated from a specific rows of cells to be visible by a respective mirror based on the orientation of the mirror relative to the PGU 550.

Thus, employing the concepts disclosed herein, the TFT cells associated with the sets of alternating rows may be electrically coupled to an electronic system or a microprocessor associated with the digital rendering of the two contents displayable on the HUD.

Employing the aspects shown in FIG. 5, the usage of the blind wall becomes unnecessary. Further, the display surface can entirely be used for one or another optical path without image leak from one optical path to another.

Figure 6B:
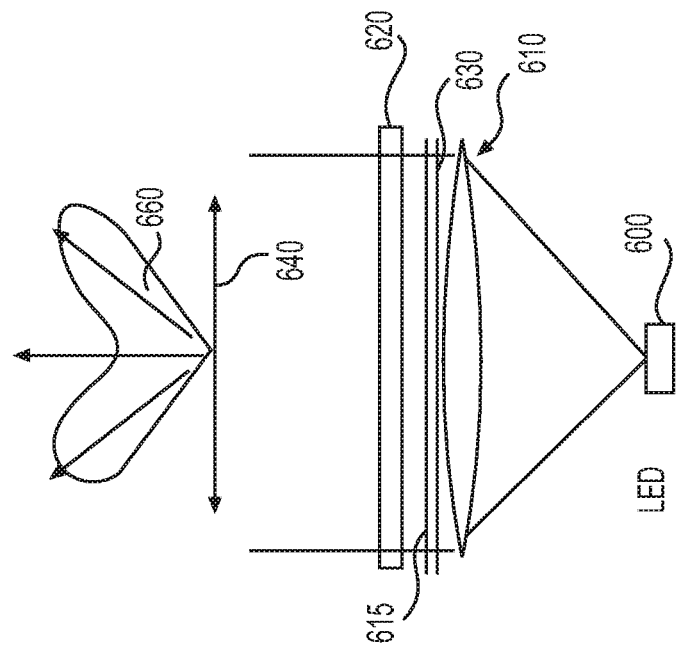
FIGS. 6(a) and (b) illustrate an exemplary backlight technique for employment with the HUD system of FIG. 5.
Figure 6A:
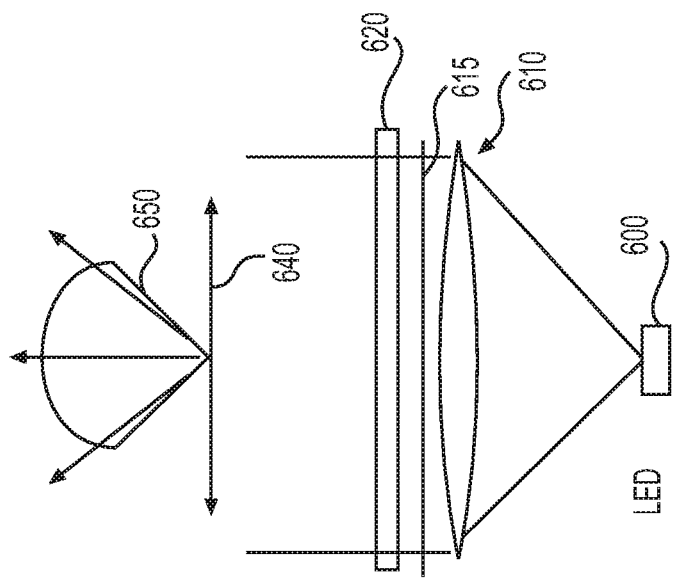
Figure 7:
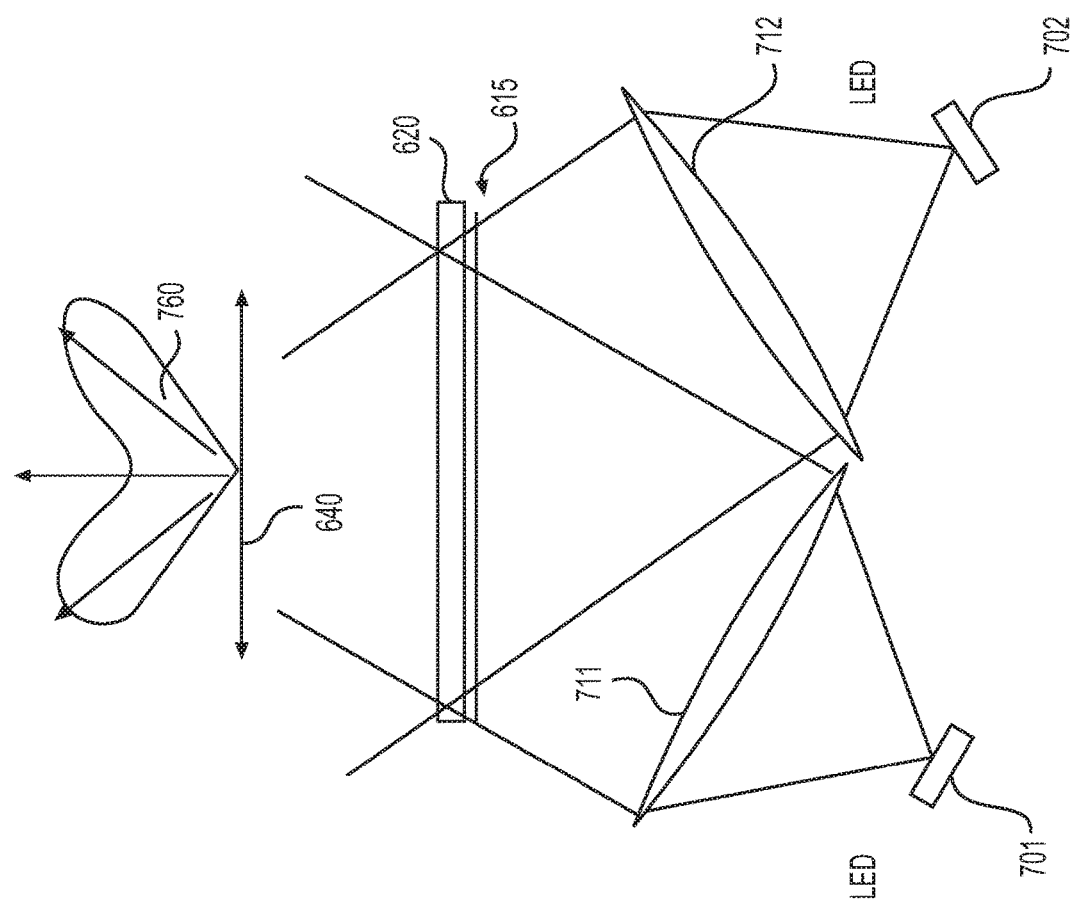
FIG. 7 illustrates another exemplary backlight technique for employment with the HUD system of FIG. 5.

FIGS. 6(a)-(b) and 7 illustrate an optimization of a backlight according to the aspects disclosed herein. FIG. 6(a) illustrates an example of backlighting without optimization, while FIG. 6(b) illustrates employment of a film employable to optimize the cone of illumination.

In both FIGS. 6(a) and (b), light is generated from a backlight 600. The backlight 600 may be a light emitting diode (LED). The light is propagated to a lens 610, through a diffuser 615 and ultimately to the TFT 630.

As shown in FIG. 6(a), the illumination 650 spreads in a cone-like fashion via an axis 640. In contrast, in FIG. 6(b), the illumination 660 only propagates to two directions (and not the center direction). This is due to the inclusion of a film employed to replicate this effect, diffuse light propagating directly forward to the sides. One such example of a film is a brightness enhancement film (BEF).

As shown in FIG. 7, the optimization shown in FIG. 6(b) is achieved without the use of a film 620. In FIG. 7, two backlights are employed (701 and 702). The backlights are each oriented towards the left and right axis, respectively. Additionally, each backlight 701 and 702 is provided a respective lens 711 and 712.

As shown in FIG. 7, the illumination 760 occurs primarily at the axis corresponding to the left of center and right of center, similar to that shown in FIG. 6(*b*). However, an additional set of backlights and lenses are required for this optimization.

Thus, employing the aspects disclosed herein, an implementer of a dual image HUD may effectively achieve dual images with one picture generating unit (PGU), and employment of the alternative TFT columns (as shown above), with black stripes (as also shown above).

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A dual image head-up display (HUD), comprising:
a cell-based display, the cell-based display is defined with a plurality of a first set of cell rows and a plurality of a second set of cell rows, wherein each of the plurality of the first set of cell rows and each of the plurality of the second set of cell rows alternate with each other;
a first mirror in a first optical path;
a second mirror in a second optical path, wherein the second optical path is separate from the first optical path outside the cell-based display to reduce inter-path image leakage;
a backlight configured to project light to the cell-based display, the backlight is defined with a first backlight source projecting a first cone of the light along the first optical path through the cell-based display to the first mirror, and a second backlight source separate from the first backlight source and projecting a second cone of the light along the second optical path through the cell-based display to the second mirror;
a first lens disposed between the first backlight source and the cell-based display, and configured to collimate the first cone of the light;
a second lens disposed between the second backlight source and the cell-based display, and configured to collimate the second cone of the light; and
a plurality of black stripes disposed on the cell-based display on a surface opposite the backlight,
wherein each of the plurality of black stripes overlaps at a portion of one of the first set of cell rows and one of the second set of cell rows, blocks the light from the first backlight source from reaching the second mirror, and blocks the light from the second backlight source from reaching the first mirror.

2. The dual image HUD according to claim 1, further being coupled to a microprocessor, the microprocessor being configured:
to generate first content only viewable via the plurality of the first set of cell rows; and
to generate second content only viewable via the plurality of the second set of cell rows.

3. The dual image HUD according to claim 1, wherein the backlight is a plurality of light emitting diodes.

4. The dual image HUD according to claim 1, wherein the cell-based display is a thin-film transistor display.

5. The dual image HUD according to claim 1, further comprising a third mirror oriented to reflected content received from the second mirror.

6. The dual image HUD according to claim 5, further comprising a transparent screen oriented to receive reflected content from the third mirror.

7. The dual image HUD according to claim 6, wherein the transparent screen is a front windscreen.

8. The dual image HUD according to claim 1, wherein
the first optical path is angled away from a center direction normal to the cell-based display, and
the second optical path is angled away from the center direction.

9. A dual image head-up display (HUD), comprising:
a cell-based display, the cell-based display is defined with a plurality of a first set of cells and a plurality of a second set of cells, wherein the plurality of the first set of cells and the plurality of the second set of cells alternate with each other;
a first mirror in a first optical path;
a second mirror in a second optical path, wherein the second optical path is separate from the first optical path outside the cell-based display to reduce inter-path image leakage;
a backlight configured to project light to the cell-based display, the backlight is defined with a first backlight source projecting a first cone of the light along the first optical path through the cell-based display to the first mirror, and a second backlight source separate from the first backlight source and projecting a second cone of the light along the second optical path through the cell-based display to the second mirror;
a first lens disposed between the first backlight source and the cell-based display, and configured to collimate the first cone of the light
a second lens disposed between the second backlight source and the cell-based display, and configured to collimate the second cone of the light and
a chess-like pattern of light blocking material disposed on the cell-based display on a surface opposite the backlight,
wherein the chess-like pattern of light blocking material blocks the light from the first backlight source from reaching the second mirror, and blocks the light from the second backlight source from reaching the first mirror.

10. The dual image HUD according to claim 9, further being coupled to a microprocessor, the microprocessor being configured:
to generate first content only viewable via the plurality of the first set of cells; and
to generate second content only viewable via the plurality of the second set of cells.

11. The dual image HUD according to claim 9, wherein the backlight is a plurality of light emitting diodes.

12. The dual image HUD according to claim 9, wherein the cell-based display is a thin-film transistor display.

13. The dual image HUD according to claim 9, further comprising a third mirror oriented to reflect content received from the second mirror.

14. The dual image HUD according to claim 13, further comprising a transparent screen oriented to receive reflected content from the third mirror.

15. The dual image HUD according to claim 14, wherein the transparent screen is a front windscreen.

16. The dual image HUD according to claim 9, wherein
the first optical path is angled away from a center direction normal to the cell-based display, and
the second optical path is angled away from the center direction.

* * * * *